United States Patent
Senaydin

(10) Patent No.: US 9,086,224 B2
(45) Date of Patent: Jul. 21, 2015

(54) FAN MODULE AND FAN MODULE ASSEMBLY FOR PERISHABLE TRANSPORTATION AND AS DISPLAY SHELVES

(76) Inventor: Mustafa Serdar Senaydin, Doral, FL (US)

(*) Notice: Subject to any disclaimer, the term of this patent is extended or adjusted under 35 U.S.C. 154(b) by 56 days.

(21) Appl. No.: 14/125,583

(22) PCT Filed: Jul. 4, 2011

(86) PCT No.: PCT/TR2011/000167
§ 371 (c)(1),
(2), (4) Date: Dec. 12, 2013

(87) PCT Pub. No.: WO2012/173579
PCT Pub. Date: Dec. 20, 2012

(65) Prior Publication Data
US 2014/0103548 A1  Apr. 17, 2014

(30) Foreign Application Priority Data
Jun. 14, 2011  (TR) .............. a 2011 05816

(51) Int. Cl.
| | | |
|---|---|---|
| B01F 3/04 | (2006.01) | |
| F24F 6/16 | (2006.01) | |
| B65D 19/38 | (2006.01) | |
| B65D 71/00 | (2006.01) | |
| B65D 81/26 | (2006.01) | |
| B65D 85/34 | (2006.01) | |
| A47F 3/00 | (2006.01) | |
| A47F 7/00 | (2006.01) | |

(52) U.S. Cl.
CPC . *F24F 6/16* (2013.01); *B65D 19/38* (2013.01); *B65D 71/0096* (2013.01); *B65D 81/263* (2013.01); *B65D 85/34* (2013.01); *A47F 3/001* (2013.01); *A47F 7/0071* (2013.01); *Y02W 30/807* (2015.05)

(58) Field of Classification Search
CPC ....... A47F 3/001; A47F 7/0071; B65D 19/38; B65D 71/0096; B65D 81/263; B65D 85/34; F24F 6/16; Y02W 30/807
USPC .............. 261/28, 78.2, 115, DIG. 3, DIG. 14, 261/DIG. 43
See application file for complete search history.

(56) References Cited

U.S. PATENT DOCUMENTS

| | | | | |
|---|---|---|---|---|
| 3,194,211 | A | * | 7/1965 | Stanek ......................... 119/203 |
| 4,824,685 | A | | 4/1989 | Bianco |
| 5,035,077 | A | * | 7/1991 | Palmer .............................. 47/17 |
| 5,456,379 | A | * | 10/1995 | Krupa et al. .................. 220/835 |
| 5,791,150 | A | | 8/1998 | Bosher et al. |

(Continued)

FOREIGN PATENT DOCUMENTS

| | | |
|---|---|---|
| CH | 597746 A5 | 4/1978 |
| EP | 0742886 B1 | 10/2004 |

(Continued)

*Primary Examiner* — Charles Bushey
(74) *Attorney, Agent, or Firm* — Gokalp Bayramoglu

(57) ABSTRACT

This invention is related to a portable and advanced intermodal for the transportation of "perishable products" and to a fan module and fan module pod assembly which may be used as a display stand disposable or reusable embodiment fabricated using virgin or recycled materials made of corrugated cardboard, natural or pressurized lumber, metal, FRP, or other reusable plastic to be used together with any ISO or GMA certified pallet.

5 Claims, 9 Drawing Sheets

(56) References Cited

U.S. PATENT DOCUMENTS

| | | | |
|---|---|---|---|
| 6,237,896 B1* | 5/2001 | Hicks et al. | 261/28 |
| 6,789,787 B2* | 9/2004 | Stutts | 261/28 |
| 7,823,865 B2* | 11/2010 | Baldon et al. | 261/28 |
| 8,403,304 B2* | 3/2013 | Petersen | 261/28 |
| 2004/0031705 A1* | 2/2004 | DeTemple et al. | 206/213.1 |
| 2008/0237900 A1* | 10/2008 | Junkel et al. | 261/28 |
| 2009/0206496 A1* | 8/2009 | Lee | 261/28 |
| 2009/0211287 A1 | 8/2009 | Steele et al. | |
| 2011/0233077 A1* | 9/2011 | Cadiente et al. | 206/204 |
| 2012/0061391 A1* | 3/2012 | Sambrailo et al. | 220/23.4 |

FOREIGN PATENT DOCUMENTS

| | | |
|---|---|---|
| JP | 2010260555 A | 11/2010 |
| WO | WO03/030662 A1 | 4/2003 |

\* cited by examiner

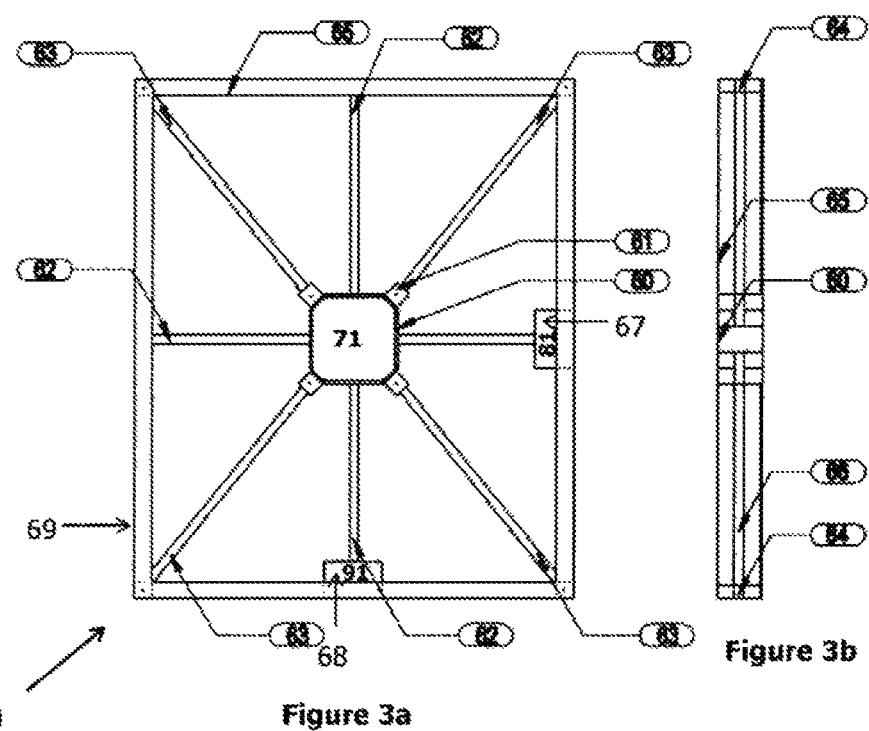
Figure 3a
Figure 3b
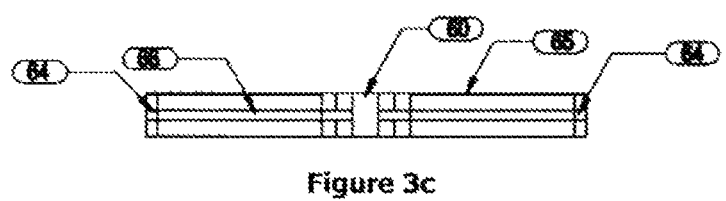
Figure 3c

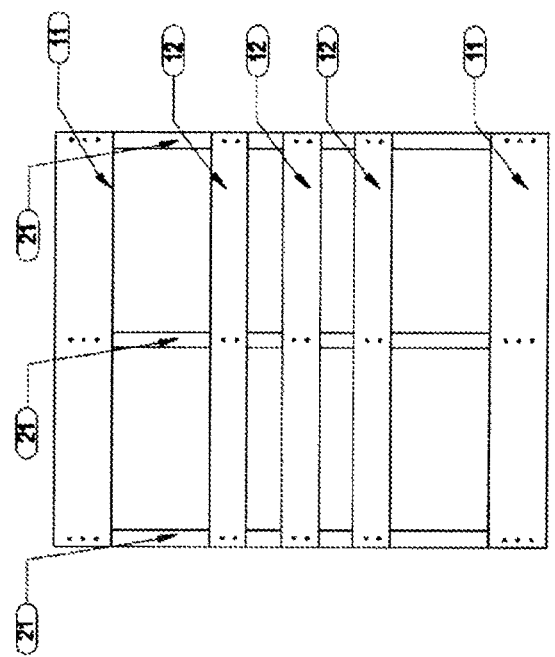
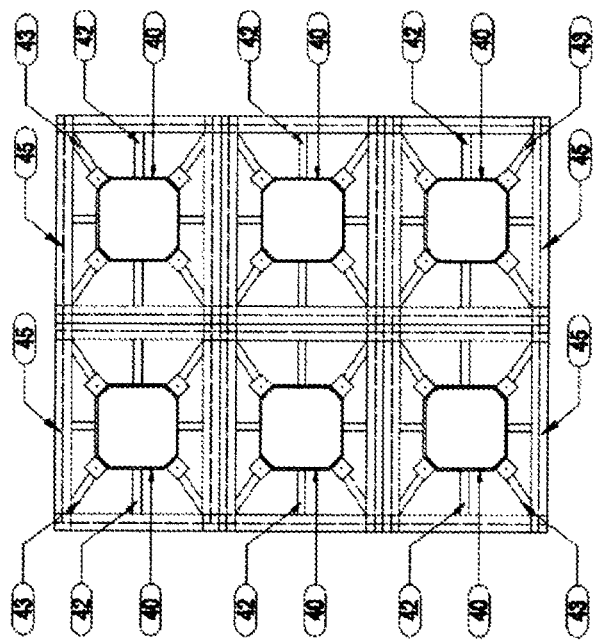
Figure 6b
Figure 6a

FAN MODULE AND FAN MODULE ASSEMBLY FOR PERISHABLE TRANSPORTATION AND AS DISPLAY SHELVES

TECHNICAL FIELD

This invention is related to a fan module, which includes a fan and a water-misting apparatus coupled with alternative energy storage options, inverter-charger and longlife battery, used as a singular or tandem unit.

PRIOR ART

Fresh fruits and vegetables are alive until they are consumed; post harvest they continue to breathe and maintain their vitality. This inhaling exhaling, breathing process is a part of the natural ageing and ripening process. During breathing crops extract heat and convert air into a kind of gas and release moisture to the environment which accelerates the process of deterioration and decay. Failure to keep the following factors under control may accelerate the process of decomposition for the products, which are susceptible against rapid rotting during the cold chain transportation. Effective parameters for this process are temperature, relative humidity (RH), fresh air (oxygen, carbon dioxide, and nitrogen), and ethylene gas (C2H4) circulation, loading patterns or packing methods.

Relative humidity directly affects the quality of almost all products. If humidity levels are too low, fruits, vegetables and related products may wilt or shrivel. If relative humidity is too high, mold may develop to deteriorate the cargo. Most of fruits and vegetables need 95-100% of R.H. to maintain moisture content and to prevent plant from wilt. Relatively there are only a few Cold Storage and Reefer transportation units (intermodal) in the world which can maintain conditioned air at desired levels and R.H. at 85% or above. In fact most perishable products are cooled down during transportation and certainly is not the most effective way of handling within the "Cold Chain". Some reefers also have a special dehumidification feature to reduce R.H., which is desired for some perishable cargoes such as flower bulbs, coffee nut, cocoa nut, electronic parts, film pharmaceuticals etc.

Poor circulation can have an effect on the commodity's temperature, relative humidity and ethylene accumulation. If the conditioned air cannot circulate properly in the cold room, during transportation or retail display, shelf life of the product will be definitely affected.

Nevertheless neither ambient nor conditioned air circulating in an opentop transportation or reefer vehicles (with HVACR, CA-MA Controlled or Modified Atmosphere equipped) makes contact with the perishables product handled. The only execption to this case is the use of "forced-air" or so called "pressurized" air circulation equipped cold rooms, which use tunnels and corridors through which circulating gentle air allowed to reach in make contact with the product being cooled or heated. As specified in U.S. Pat. No. 4,824,685, conditioned and guided air penetrates into the boxes and product, which is neatly packed in its original box.

Conventional methods of transportation including unconditioned and unrefrigerated trucks, trailers, containers, rail cars, barges and vessels do not have any air circulation through the tightly packed boxes. Air is like water takes the least resistance and when faced with a major barrier like a block of mass (just like a wall, a container or room full of product packed butt to butt with pallets, which are also tightly packed have no room to breathe.

Most of the air delivered in these closed environments by the standard refrigeration equipment delivering conditioned air slowly reaches the product through convection. That is, first points of contact are the faces of the pallets and external boxes of the boxes. This is about ⅙ of the six faces of the corner boxes. By the time the cool air reaches the core or the contents of the boxes, the damage is already irreversible in most cases. Main air delivery usually flows through the top of the pallets generally chilling the product delivered on the top layer and the rest of the boxes suffer air flow and create pockets of abnormal temperatures and unwanted conditions. Later the conditioned air reaches the back of the vehicle and returns to the refrigerated air loop without touching a single layer of product.

Similar problems are observed during "Cold Chain Logistics", lack of air circulation within traditional transportation, storage rooms, delivery pallets and display shelves at the retail stores.

Currently available HVACR units for perishables handling are not equipped to handle urgent need of temperature pull-down or decelerate maturity for delayed deliveries or extended storage. Even at the retail display shelves which is the last link in the "Cold Chain" suffers from the same inefficiency.

The comfort and longevity of the premium condition of the perishables will be achieved only by eliminating stress caused by lack of airflow during storage and transportation.

For example, the European Patent No EP 0742 886 B1 claims, a pallet transportation system equipped with a packaged cooling system and an outer protective wall or shelter is needed in order to protect the goods transported against ambient conditions and nature. Further, this system also contains a mechanical (evaporator with a compressor and condenser—with an expanded gas through pressurizing) refrigeration system.

Within this invention through this application, which is claimed and defended to be unique requires neither an outer wall—shelter nor mechanical refrigeration for air recirculation.

Regarding the international application No PCT WO 03/030662 A1, again a closedloop air recirculation system is used together with walls. doors and shelves etc. With this invention and application, there is no requirement for any immediate shelter or air recirculation. This invention, which is unique and suitable for air delivery application without the use of an additional shelter or recirculated air, providing moisture equipped with smart batteries, fan(s) for any form of transportation (land, ocean or air), storage and display.

BRIEF DESCRIPTION OF THE INVENTION

This invention is related to a fan module for portable and advanced intermodal transportation of "perishable products" and to a fan module that can be used with a platform created for intermodal transportation including disposable or reusable platforms consisting of materials such as corrugated boards, pressure treated natural timber, metal or reusable polyethylene plastics, fibre glass reinforced plastic (FRP) or any ISO classified platform. This fan module has a base, four-way access for handling, transportation or lifting purposes, allowing platforms or pallets to be transported and lifted with a forklift or a manual palletjack; this fan module is used for transportation of "fresh fruits, vegetables and other perishable products" during "Cold Chain Transportation"

from agricultural farms or fields to packing facilities, ports, wholesalers, distribution centers, supermarkets and convenience stores etc; this fan module is equipped with a mister, motorized AC-DC or EC feed direct drive, fan with universal air flow, UPS (uninterrupted power supply) backup system complete with flexible charging and renewable energy accumulator preventing decay and waste through inefficient handling.

This invention is related to a portable and preventive fan module; this fan module will be used in intermodal transportation together with a platform embedded in a known standard pallet; this fan module also used as a display shelf for presentation of the products. Either as an apparatus, which provides uniform flow of conditioned air (cool or warm depending on requirements) that reaches every layer of tightly packed product in-a storage facilities, trucks or ships; or a tool providing gentle flow of air under normal ambient atmosphere conditions without any need for recirculation, this invention allows uniform and gentle air flow making direct contact with most perishables like fruits, vegetables, pharmaceuticals or similar products. Furthermore, this fan module is a product, which can be utilized either way, up or down; top or bottom in any position through Cold Chain transportation, and this invention can be used as a display shelf, on which products transported from farms can be directly presented in retail markets. In addition to the basic features of the invention, which minimizes or reduces shrink thereby waste or losses, this fan module is made of environmentally safe materials and this invention is perceived as an environmentally friendly "Green" product as it can be manufactured through recycled materials and it uses electronically self controlled and regulated renewable and stored energy at a minimum level rate with regard to the base usage.

This fan module is a modular design fully-functional, even the smallest common denominator unit or the basic fan module, or when assembled to form a larger standard size, will handle a respective full load of product as a complete unit. At the same time, this fan module has a structure, which can be directly installed on any standard ISO-GMA platform.

BRIEF DESCRIPTION OF FIGURES

The subject invention is illustrated with figures shown and explained below:

FIG. 3a. Plan view of the subject invention fan module.
FIG. 3b. Side view of the subject invention fan module
FIG. 3c. Rear view of the subject invention fan module
FIG. 4a. Plan view of the top mounted fan module on a standard pallet
FIG. 4b. Base view of the top mounted fan module on a standard pallet
FIG. 4c. Side view of the top mounted fan module on a standard pallet
FIG. 4d. Rear view of the top mounted fan module on a standard pallet
FIG. 5. A fan module assembly with 6 fan modules
FIG. 6a. Plan view of the fan module assembly with 6 fan modules, mounted on a pallet.
FIG. 6b. Base view of the fan module assembly with 6 fan modules, mounted on a pallet.

DETAILED DESCRIPTION OF THE INVENTION

Figure 1:
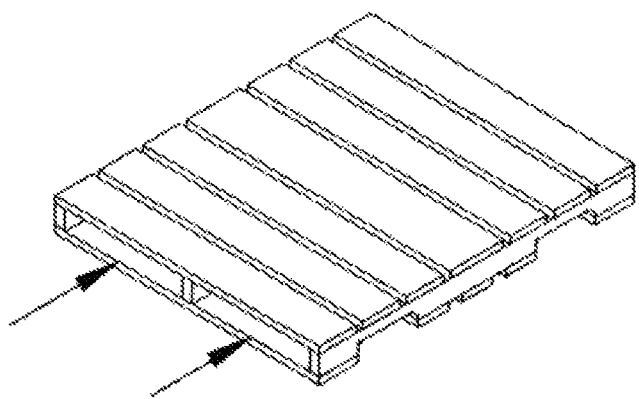
FIG. 1. Represents currently used ISO (International Standards Organization) and GMA (Grocery Marketing Association) rated standard pallet.

This invention is for a fan module providing, ease of handling and safety for perishable products, which does not harm, the boxes nor the contents upon contact, preferably fabricated from a visually thin rigid and durable recycled or reusable materials, like corrugated paper, timber, FRP (fibreglass reinforced plastics) such as polyethylene.

A modular design with multifan module measuring about 100-180 mm (4-8") height, and 1000×1200 mm (40"×48") base sharing the same foot print of a GMA-ISO transport or display pallet apparatus housing AC-DC-EC powered movable fans with a protective top layer, providing safe recirculating (or non recirculating) air flow complete with power adaptor, rechargeable battery, battery charger assembly named CFA (Custom Forced Air) are used as shelves, display shelves or alternative preventive transport units also adopt to all and every varying sizes of the MUM standard (Modulularization Unitization Metrification) fabricated with reinforced corrugated paper, cardboard, timber boxes or plastic chests for horticulture and perishable products.

The Modular design with multiple modules or units are used for easy adoption of any size MUM containers for horticultural crops fabricated from paper to form reinforced corrugated carton, timber boxes or plastic shipping crates as an alternate embodiment multi-compartment protective shipping and display stand or this current invention complete with representative power source adapter, battery and battery charger. hardware and connections for the safe and reversible vented-air assisted base and top housing the portable AC-DC-EC rated fan installed shipping or display shelf creating a base pattern equal that of the GMA-ISO pallets that are 40'×48" or 1000 mm by 1200 mm base with its height ranging from 100 mm to 180 mm or 4" to 8". The subject invention is fabricated as a stand alone one piece or as an add-on unit to any existing GMA-ISO pallet being used worldwide logistics and handling. The invention extends the shelf-life of fruits and vegetables, by reducing or eliminating heat generated after harvest, during the "COLD CHAIN" logistics or handling.

When variety of different sized boxes are packed at the same time, using boxes in standard sizes can greatly ease future handling. When handling nonuniform boxes, stacks can be unstable or heavier boxes can cruch lighter ones. An unstable load is likely to fall over during transport or collapse during storage.

Recommended container sizes are shown below. These containers are part of the MUM (Modularization, Unitization and Metrication) program advocated by USDA (US Department of Agriculture). Boxes may be stacked in various forms depending on the sizes, yet still form a stable, balanced load on a pallet in dimensions of 1000×1200 mm (40×48 inches).

MUM containers for horticultural products:

| External Dimensions mm | (inch) | Quantity per Layer | Area of the Used Pallet Surface (%) |
|---|---|---|---|
| 600 × 500 | (23.62 × 19.69) | 4 | 100 |
| 500 × 400 | (19.68 × 15.75) | 6 | 100 |
| 600 × 400 | (23.62 × 15.75) | 5 | 100 |
| 500 × 333 | (19.68 × 13.11) | 7 | 97 |
| 600 × 333 | (23.62 × 13.11) | 6 | 99 |
| 500 × 300 | (19.68 × 11.81) | 8 | 100 |
| 475 × 250 | (18.70 × 9.84) | 10 | 99 |
| 400 × 300 | (15.75 × 11.81) | 10 | 100 |
| 433 × 333 | (17.01 × 13.11) | 8 | 96 |
| 400 × 250 | (15.74 × 9.84) | 12 | 100 |

This invention may be added to current GMA-ISO pallets as a supplementary unit in order to add nitrogen and humidity during "Cold Chain Logistics and Packaging" between Cold Chain links and display shelves to minimize or eliminated undesired gases such as Oxygen-02(Ethylene-C2H4 or Carbon Dioxide-C02 and heat worldwide long distance logistics and handling to preserve freshness of products and longer shelf life.

The mechanized part of the invention may be divided into two sections, a top and a bottom. The mechanized part of the invention may be divided into two sections, a top and a bottom frames and respective protective layers. Either placed on top of the boxed perishables or forming the base for stacking the same at the very bottom provides gentle vertical flow of refreshing air and are utilized for delivery, storage or display purposes. Tightly packed perishables in cardboard or timber boxes further wrapped in airtight or perforated plastic bags during storage or transportation are kept in refrigerated shelters with humidity added circulating conditioned air. With the use of the subject invention the moisture laden air within the shelter or the conditioned air circulating uniformly penetrates every boxed perishable to even out the spread and maintain uniform temperature and Relative Humidity throughout the process.

Most perishables are packed and shipped with ISO-GMA standard pallets and the circulating air flows around the exposed surfaces only. Under these circumstances the boxes which the perishables are packed register varying temperature spread and relative humidity readings. Both the storage facilities and intermodal reefer vessels are designed for maximum storage and delivery capacity within a very tight space, however under these conditions the perishables experience extremes on both ends and show stress related sydroms, thus start decay sooner and their shelflife is reduced. During logistics from the farm to the consumer, about 40-50% of the product is wasted through shrink and the energy, fuel, human resources, tangible assets are lost irreversibly.

Utilizing the subject invention, improving air delivery to the core boxes is aimed without the use of mechanical refrigeration, simply by improving the ventilation within the shipping or storage containers and removing at least 2-4° F. or 1-2° C. with added moisture and maintaining ambient temperature for an extended handling.

Portable, disposable or (if needed) completely returnable and reusable, this invention will improve handling conditions and reduce waste during local and long distance transportation or long term storage. It is known that immediately after harvest (being cut of their main supply of water and nutrition), if not properly cooled or handled perishables like fresh fruits and vegetables start immediate decay, weight loss, flavour and lose their appeal, economic and nutritional value.

The subject invention with its ribbed open design is lightweight, provides comfortable stress-free housing for perishables (fruits) with vibration isolation and vertical flow air suction during delivery and retail display. Reusable units are fabricated of clear or easily cleanable hygienic materials are also designed for easy cleaning, maintenance and washable after each use, thus achieving maximum productive service life. Mechanical parts and contents (forced air fan, rechargeable battery and charger) are completely reusable parts, in the event the embodiment is damaged and deemed not reusable the mechanical section may be returned to the country of origin for remanufactured use or proper disposal.

Figure 2:
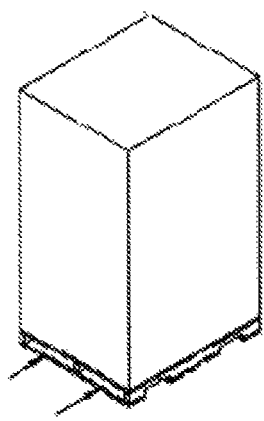
FIG. 2. Represents a similar pallet loaded with stock keeping units for 100% utilization and packing of GMA pallets used during logistic chain and transportation.
Figure 4C:
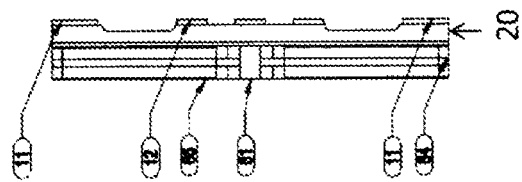
Figure 4B:
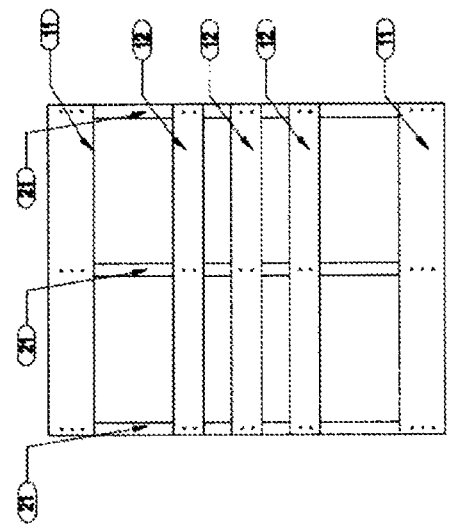
Figure 4A:
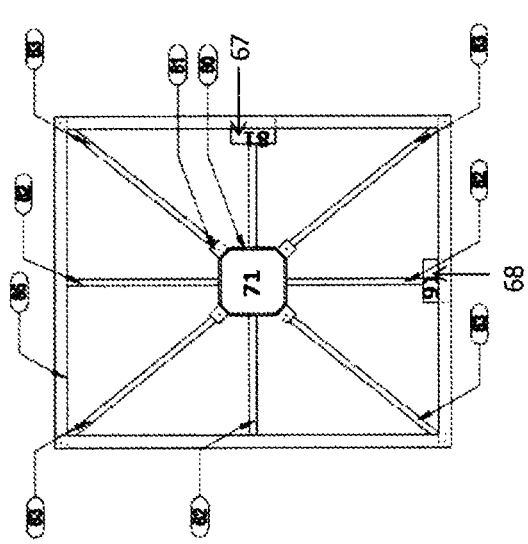
Figure 4D:
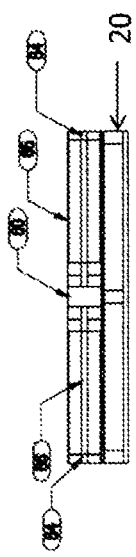

FIGS. 1 and 2 represent commonly used ISO (International Standards Organization) and GMA (Grocery Manufacturers Association) certified four-way transportation pallets used for logistic transportation and packaging of many (SKU's) stock keeping units.

FIG. 3 shows the subject invention fan module. This fan module is comprised of a fan module frame (69) contains at least one Mechanical Fan Housing (60), Half Size Corner Element (61), Central Plus Support Unit (62), Central Cross Support Unit (63), Vibration Insulation Element (Membrane Connectors) (64), Edge Connection Element (65), water spray apparatus housing (67), at least one power unit (battery and charging device) housing (68) and a power unit (91) comprising of a rechargeable battery and charger to be mounted into the battery and charge device housing, at least one mechanical fan (71) to be mounted into the fan housing and water spray apparatus (81). Optional battery and interconnecting chargers may be mounted into separate housings or the same housing. Mechanical fan to be mounted into the mechanical fan housing (60) may be axial or centrifugal type. While the fan module frame acts as a support network comprising of the side protection connectors (64) located in the related corners, the Central Plus Support Unit (60) and the Central Cross Support Unit (63) as well as a network of them may be used for extra power storage.

The fan module (10) specified in FIG. 3 comprises of the related elements and it may be mounted into the frame of a common pallet (20). In other words, the fan module may be formed by using any common pallet as a subject invention fan module frame.

FIG. 4 shows demostration of the fan module mounted onto a common standard pallet (20) from different views. The platform, which is obtained as a result of positioning the fan module below the boxes (50), in which perishable products are kept, are placed onto the most common standard pallets is shown. The bottom deckboards and stringers (11, 12 and 21) within the pallet (20) have four-way access channels compatible with ISO-GMA standard for lifting and transferring with pallet jacks, manual or powered forklifts.

Figure 5:
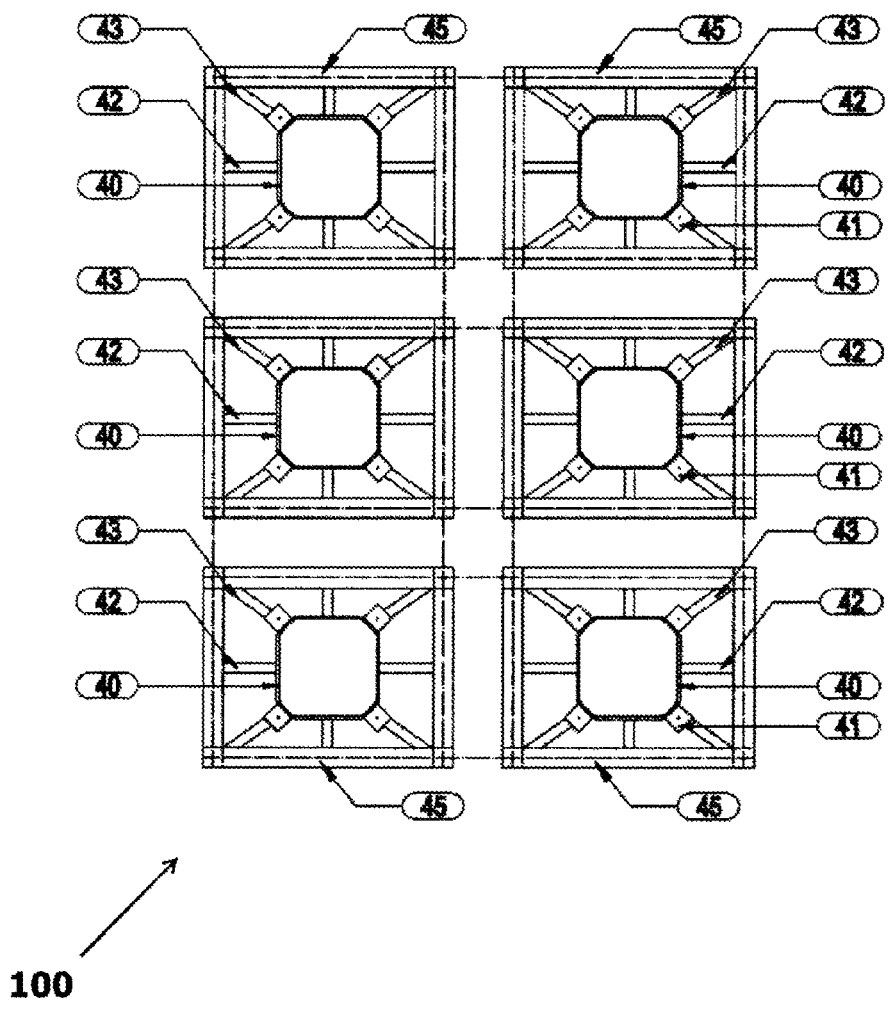

FIG. 5 shows the plain view of the fan module assembly comprising of 6 fan modules. The fan module assembly, which comprises of more than one fan module, is fabricated through a single-step production process that is similar to the production of the single-fan module.

FIG. 6 shows base and plain views of the fan module assembly comprising of 6 fan modules placed onto a common standard pallet (20).

Figure 7:
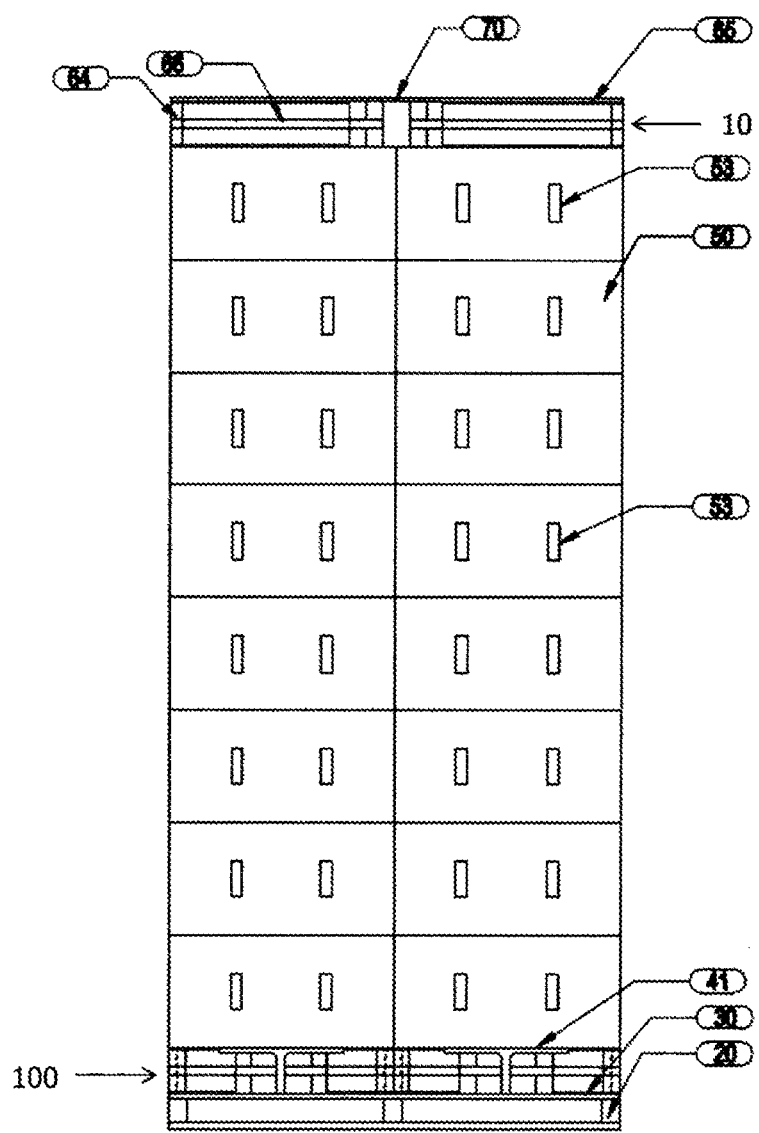
FIG. 7. An integrated plate with matching air flow openings for the fan module assembly, subject fan module with at least one fan, boxes of perishables packed in boxes, immediately below the boxes an alternate subject invention fan module with a matching footprint, another matching top plate for assembly.

The current invention may be used as mounted onto the most common pallets (20) used for current transportation activities, if desired. As shown in FIG. 7;
  common pallets (20)
  a plate (30) as a supplementary finished unit for the ventilation mechanism of the fan module
  the fan module assembly (100)
  the boxes (50), in which perishable products are preserved another fan module (10) to be placed over the boxes with equal dimensions to those of the fan module assembly under the boxes a final plate (70) as a supplementary unit for the ventilation mechanism of the fan module the transportation and display platforms, which embodies the above-stated mechanisms, will be one of the many arrangement of systems as per demand in which this invention will be used. FIG. 7 shows rear view of the transportation and display platforms.

While the subject invention may be placed over and under the boxes as shown, they may also be placed solo on top of the boxes, If the fan module assembly (100) is placed onto a common pallet (20) at the bottom of the boxes (50), there will be no need to place another on top.

However, the placement of the subject invention fan module over or under the boxes (50), in which perishable products are packed, is determined as per individual transportation needs since on the commonly used refer trailers have top to bottom air delivery, whereas in the most common reefer containers the conditioned air delivery is from the floor. Thus the subject invention fan module will be placed accordingly and the desired air circulation will be provided.

The fan modules and the fan module assembly shown in FIG. 7 can be produced in all standard pallet sizes.

Figure 8:
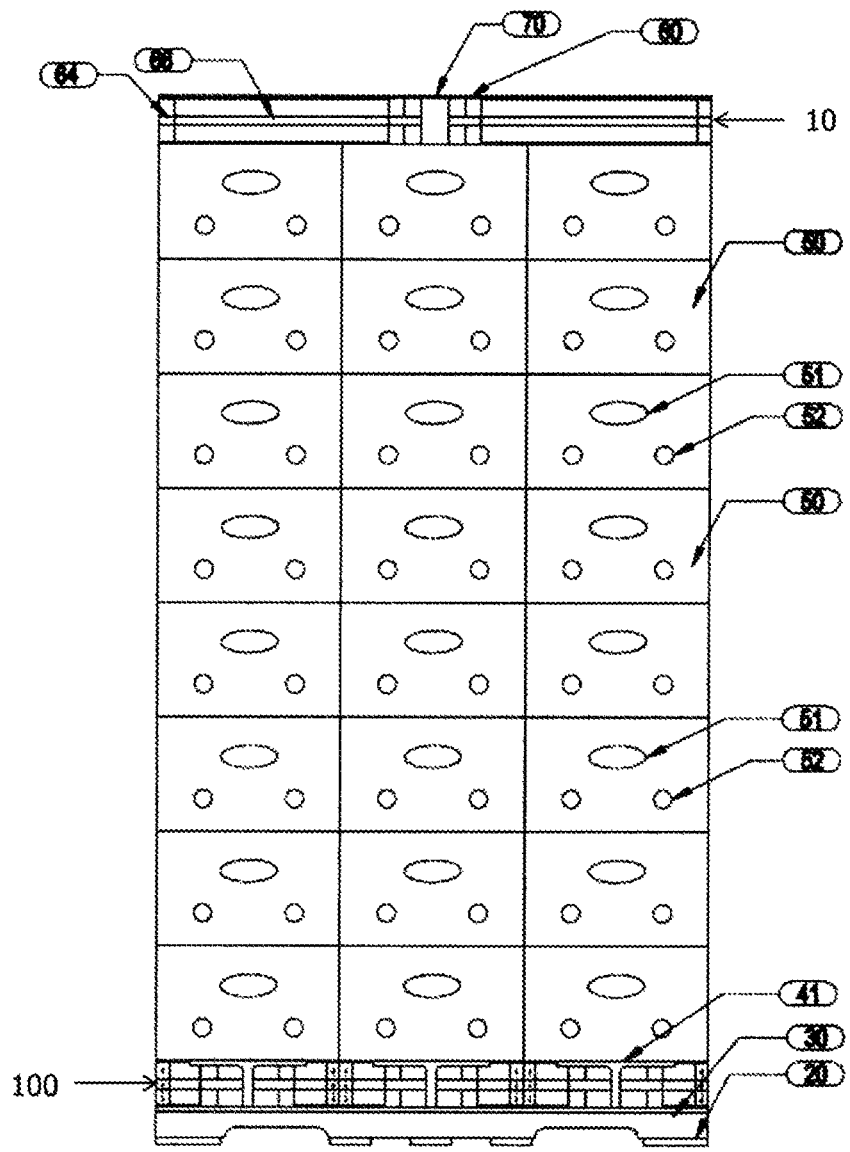
FIG. 8. Side view of the transportation and display platform specified in FIG. 7
Figure 9:
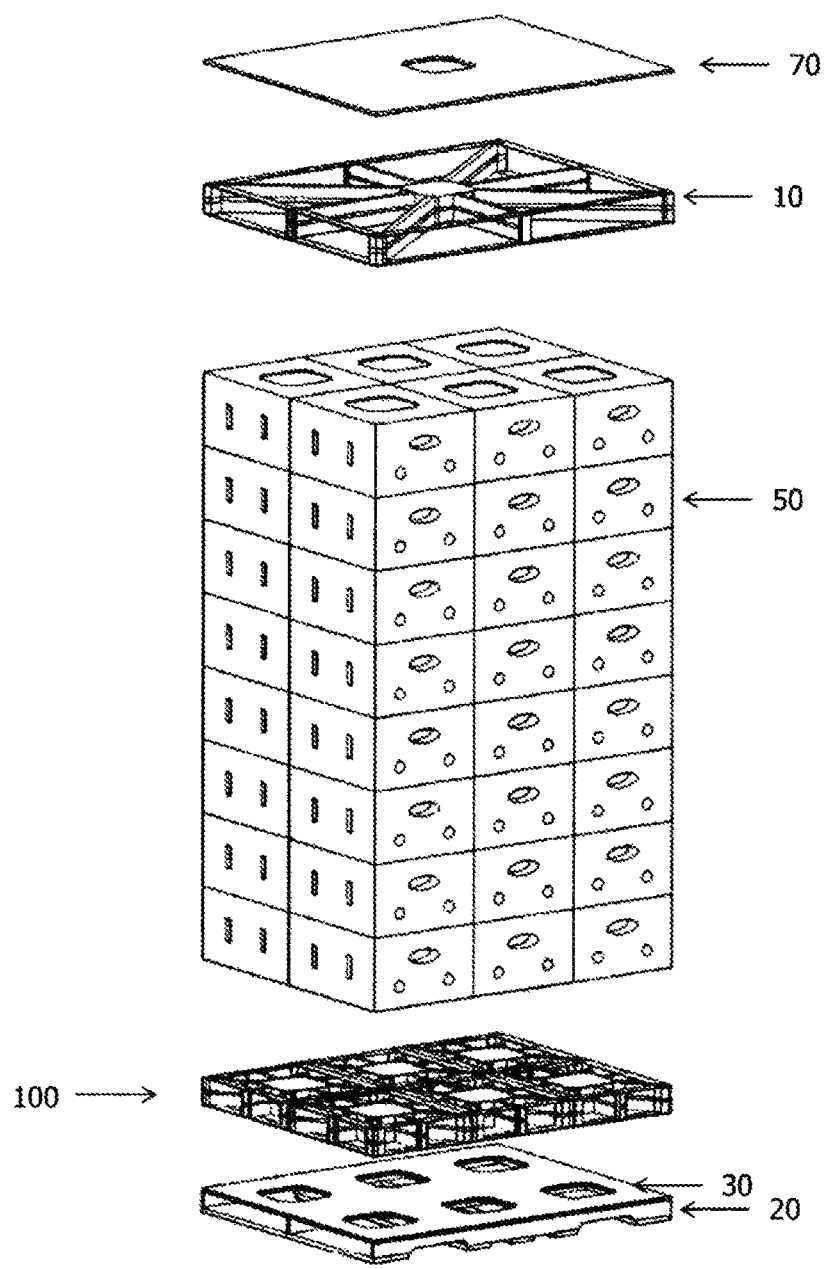
FIG. 9. 3D view of the transportation and display platform specified in FIG. 7

FIG. 8 and FIG. 9 show rear view and 3-dimensional view of the transportation and presentation platform specified in FIG. 7.

Horticultural highly perishable products are packaged within bags with perforation and placed in the corrugated cardboard boxes (50) with the vent holes (51-52-53) as shown (FIGS. 7-9).

A low-profile rotary (axial) fan with lower speed, lower noise and higher efficiency rates may be centrifugal fan. The invention fan module or the fan module assembly (40-60) may be used alternating positions by rotating it upside down (upper and lower parts are replaced with each other) and placed onto an ISO-GMA pallet.

As per its standard features, the subject invention fan module and the multifan modular assembly, as a stand-alone mechanism, may be used as a presentation shelf for displaying of fruits or customized for the distribution and transportation of perishable products as per specific requirements. In other words, this transportation or display module or platform for perishables like fresh fruits may be used either with a motorized centrifugal or axial fan.

The invention claimed is:

1. A fan module, comprising:
    a fan module frame comprises at least one fan housing, at least one water misting apparatus housing and at least one power unit housing; wherein the fan module frame further comprises a central plus support unit, a central cross support unit, a plurality of vibration insulation elements, a plurality of corner elements, and a plurality of edge connection elements;
    at least one mechanical fan placed in the fan housing;
    at least one water misting apparatus placed in the water misting apparatus housing; and
    at least one power unit comprises at least one battery and at least one charger and at plurality of connectors.

2. The fan module according to claim 1, wherein the fan module frame is made of corrugated cardboard, natural pressurized timber, FRP, polyethylene reinforced with metal or reusable fibre glass construction.

3. The fan module according to claim 1, wherein the mechanical fan is an axial or centrifugal fan.

4. The fan module according to claim 1, wherein the battery of the power unit is rechargeable.

5. A fan module assembly to be used for transportation and as a display shelf, comprising at least two interconnected fan modules of claim 1.

* * * * *